United States Patent [19]

Yoshimura

[11] Patent Number: 4,799,191
[45] Date of Patent: Jan. 17, 1989

[54] MEMORY SAVING ELECTRONIC DICTIONARY SYSTEM FOR SPELL CHECKING BASED ON NOUN SUFFIX

[75] Inventor: Motokazu Yoshimura, Nagoya, Japan

[73] Assignee: Brother Kogyo Kabushiki Kaisha, Nagoya, Japan

[21] Appl. No.: 840,660

[22] Filed: Mar. 18, 1986

[30] Foreign Application Priority Data

Mar. 20, 1985 [JP] Japan .................. 60-56417

[51] Int. Cl.⁴ .................................. G06F 15/40
[52] U.S. Cl. ...................... 364/900; 364/419
[58] Field of Search .......... 364/419, 200 MS File, 364/900 MS File; 434/156, 167, 169; 400/63, 83, 95, 100

[56] References Cited

U.S. PATENT DOCUMENTS

| | | | |
|---|---|---|---|
| 3,780,846 | 12/1973 | Kolpek et al. | 400/63 |
| 3,995,254 | 11/1976 | Rosenbaum | 382/57 |
| 4,041,467 | 8/1977 | Cota et al. | 364/900 |
| 4,136,395 | 1/1979 | Kolpek et al. | 364/518 |
| 4,158,236 | 6/1979 | Levy | 364/900 |
| 4,198,906 | 4/1980 | Fujikawa et al. | 364/900 |
| 4,218,760 | 8/1980 | Levy | 364/900 |
| 4,270,182 | 5/1981 | Asija | 364/900 |
| 4,323,315 | 4/1982 | Demonte | 400/63 |
| 4,328,561 | 5/1982 | Convis et al. | 364/900 |
| 4,339,806 | 7/1982 | Yoshida | 364/900 |
| 4,355,371 | 10/1982 | Convis et al. | 364/900 |
| 4,383,307 | 5/1983 | Gibson III | 364/900 |
| 4,384,329 | 5/1983 | Rosenbaum et al. | 364/300 |
| 4,408,302 | 10/1983 | Fessel et al. | 364/900 |
| 4,413,318 | 11/1983 | Herrington | 364/200 |
| 4,420,817 | 12/1983 | Yoshida | 364/900 |
| 4,438,505 | 3/1984 | Yanagiuchi et al. | 364/900 |
| 4,439,836 | 3/1984 | Yoshida | 364/900 |
| 4,456,969 | 6/1984 | Herzik et al. | |
| 4,467,446 | 8/1984 | Sakurai | 364/900 |
| 4,481,607 | 11/1984 | Kobayashi et al. | 364/900 |
| 4,498,148 | 2/1985 | Glickman | 364/900 |
| 4,499,553 | 2/1985 | Dickinson et al. | 364/900 |
| 4,499,554 | 2/1985 | Kobayashi | 364/900 |
| 4,502,128 | 2/1985 | Okajima et al. | 364/900 |
| 4,503,426 | 3/1985 | Mikulski | 364/900 X |
| 4,503,514 | 3/1985 | Urquhart | 364/900 |
| 4,542,477 | 9/1985 | Noyori et al. | 364/900 |
| 4,546,973 | 6/1984 | Carlgren et al. | 364/900 |
| 4,548,520 | 10/1985 | Ueno | 364/518 |
| 4,559,598 | 12/1985 | Goldwasser et al. | 364/419 |
| 4,564,301 | 1/1986 | Ueno | 364/519 |
| 4,567,573 | 1/1986 | Hashimoto et al. | 364/900 |
| 4,580,241 | 4/1986 | Kucera | 364/900 |
| 4,584,667 | 4/1986 | Hashimoto et al. | 364/900 |
| 4,590,560 | 5/1986 | Sado | 364/419 |
| 4,594,686 | 6/1986 | Yoshida | 364/900 |
| 4,597,057 | 6/1986 | Snow | 364/900 |
| 4,611,995 | 9/1986 | Sado | 364/419 |
| 4,688,192 | 5/1987 | Lavin | 433/205 |
| 4,724,523 | 2/1988 | Kucera | 364/419 |

FOREIGN PATENT DOCUMENTS 5741733 of 0000 Japan .
5926280 of 0000 Japan .

OTHER PUBLICATIONS

"Eight Bit Character Encoding for Multiple Languages", V. A. Mayfield; *IBM Technical Disclosure Bulletin*; vol. 26, No. 2, p. 537, Jul. 1983.

"Spelling Processing . . . Interface", Adam et al., *IBM Technical Disclosure Bulletin*, vol. 24, No. 10, pp. 5003–5008, Mar., 1982.

"Method for Detecting and Correcting . . . ", Barkir et al., *IBM Technical Disclosure Bulletin*, vol. 25, No. 8, p. 4225, Jan., 1983.

"Spelling Checking Typewriter", Hackett, *IBM Technical Disclosure Bulletin*, vol. 18, No. 2, pp. 530–531, Jul., 1975.

"Video Disc Dictionary System", Cohen et al., *IBM Technical Disclosure Bulletin*, vol. 25, No. 8, p. 4209, Jan., 1983.

*Primary Examiner*—Gary V. Harkcom
*Assistant Examiner*—Lawrence E. Anderson
*Attorney, Agent, or Firm*—Parkhurst, Oliff & Berridge

[57] ABSTRACT

The system includes a dictionary memory for storing a plurality of English words which are classified into two groups consisting of noun words and non-noun words, respectively; search circuitry for searching whether or not an inputted word exists in the dictionary memory; and suffix judgment circuitry for judging whether or not an inputted word has a possessive suffix. If the inputted word has one of the possessive suffixes, the group of noun words in the dictionary memory is searched to find the coincident word data to the de-suffixed input word. An output display displays the input word and the search result.

3 Claims, 6 Drawing Sheets

MEMORY SAVING ELECTRONIC DICTIONARY SYSTEM FOR SPELL CHECKING BASED ON NOUN SUFFIX

BACKGROUND OF THE INVENTION

1. Technical Field

The present invention relates to an electronic dictionary system installed in a word processor and more particularly to an electronic dictionary system having a checking means for checking spellings of input English words.

2. Prior Art

Conventionally, in a word processor having an electronic dictionary system, an English word input from a keyboard is displayed as it is on a cathode ray tube, hereinafter referred to CRT, then a central processing unit, hereinafter referred to CPU, judges whether or not the input word exists in a dictionary memory. If the word does not exist in the dictionary memory, the CPU flickers the input word on the CRT to inform an operator that the input word may be misspelt.

The conventional word processor judges, when an input word has a possessive suffix such as "'s", whether or not the input word without the suffix exists in the dictionary memory. However, in said conventional spelling check system, when an input noun incorrectly includes a possessive suffix such as "'s", the word is judged, if the coincident word data to the input word without the suffix exists in the dictionary memory, as a correctly spelt word. For that reason, there is a problem that an operator may be inaccurately informed of the misspelling of words.

SUMMARY OF THE PRESENT INVENTION

Accordingly, the object of the present invention is to solve the above-mentioned problem of the conventional word processor, namely to provide an electronic dictionary system which positively judges whether or not an input possessive noun is correctly spelled and accurately informs an operator, when an input noun mistakenly has a possessive suffix such as "'s", that the input word does not exist in the dictionary memory.

To achieve the above-mentioned object, the present invention offers an electronic dictionary system including an input means for inputting an English word, a dictionary memory for storing a plurality of English words which are classified into two groups by the parts of speech, i.e. one group being noun words and the other group being non-noun words, a search means for searching whether or not an input word exists in the dictionary memory, a suffix judgment means for judging whether or not an input word has a possessive suffix and, if the input word has a possessive suffix, for searching through the group of noun words in the dictionary memory to find the coincident word data to the input word without the suffix in cooperation with the search means, and an output means for displaying an input word and the search result. Namely, if a possessive form of an English word is input from the input means, the search means and the suffix judgment means judge whether or not the input word without the suffix exists in the dictionary memory as a noun, and the output means displays the result.

Figure 1:
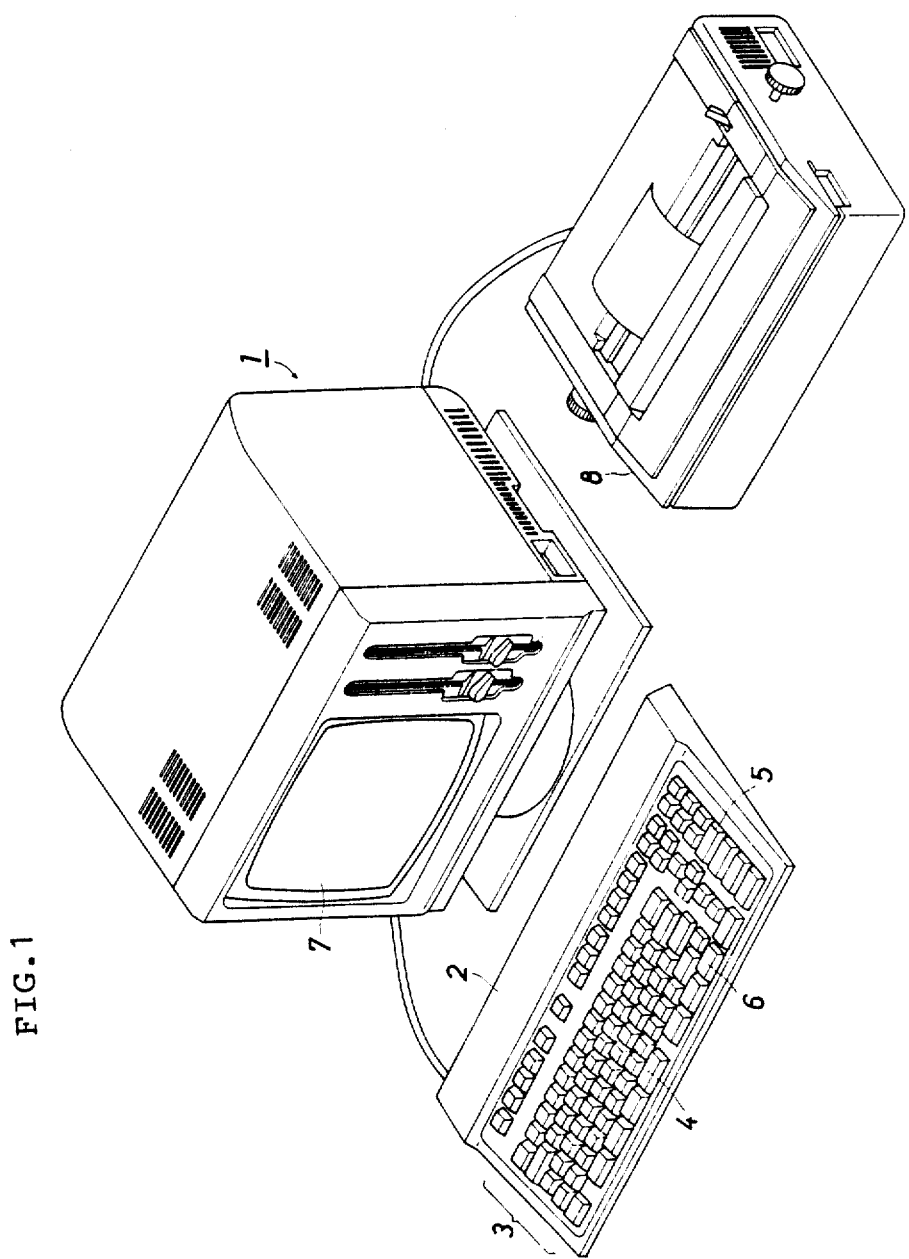
FIG. 1 is a perspective view of a word processor embodying the present invention.

In the drawings, 1 designates a word processor, 3 denotes character keys, 4 denotes a space key, 7 designates a CRT, 9 designates a CPU and 10 designates a dictionary memory.

DETAILED DESCRIPTION OF THE PREFERRED EMBODIMENT

Referring now to the drawings, and more particularly to FIG. 1, a word processor 1 with an electronic dictionary system in accordance with the present invention includes a keyboard 2 having a number of character keys 3 and a space key 4 as an input means. When these character keys 3 are operated, the coincident character data such as letters or figures are selected and input. A correction key 5 disposed on the rightside of the character keys 3 is utilized to correct an incorrectly input English word. A select key 6 disposed on the underside of the correction key 5 is utilized with the correction key 5 and the character keys 3 to change the incorrectly input word into the correct word. A CRT 7, an output device, placed on the backside of the keyboard 2 displays characters and figures input by the character keys 3 and a printer 8 placed on the side of the CRT 7 prints out words input by the character keys 3.

Figure 2:
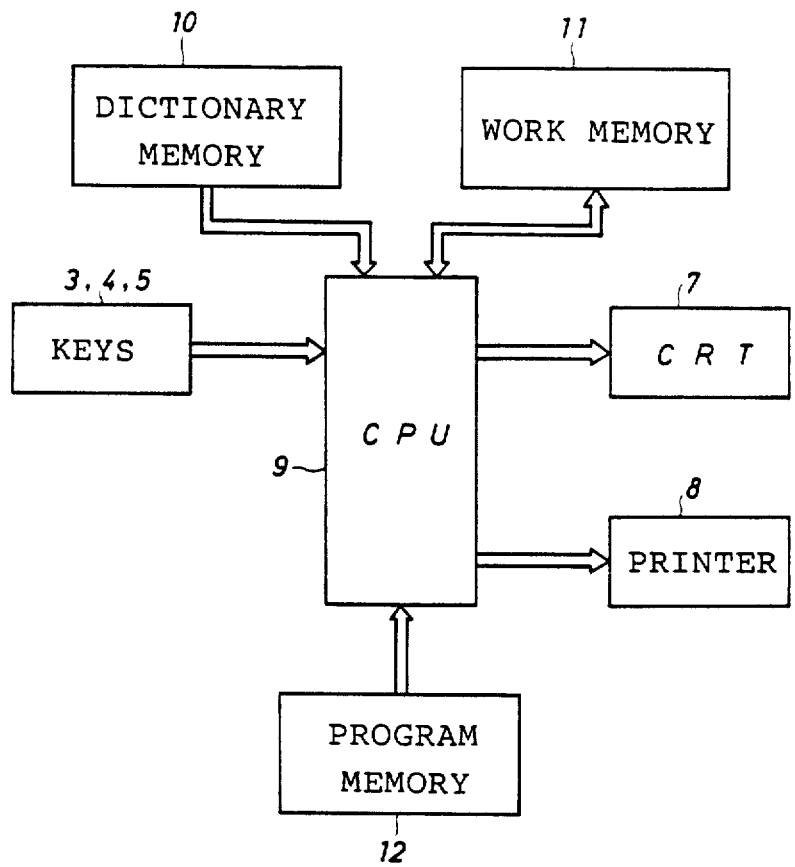
FIG. 2 is a block diagram showing an electronic construction of an embodiment according to the present invention.

Referring to FIG. 2, an electronic construction of the above-mentioned word processor is illustrated. Character data input through the operation of keys are transmitted to the CPU 9 having the output function, the judgment function and the like, and in response to these signals the CPU 9 displays the characters on the CRT 7.

A program memory 12 connected to the CPU 9 is embodied by a Read Only Memory (ROM), wherein a prescribed program for operating this word processor is stored.

Figure 3:
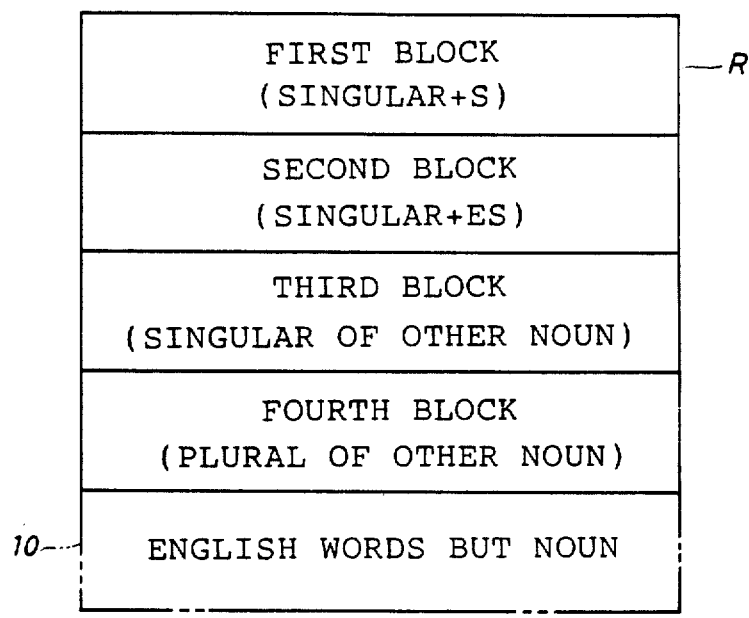
FIG. 3 is a diagram illustrative of the inside of a dictionary memory.

A dictionary memory 10 connected to the CPU 9 is embodied by a Read Only Memory (ROM), wherein a large number of English words are stored as word data. Word data of English noun words is particularly stored, as shown in FIG. 3, in a specified memory region designated as R, which is characterized in that only noun word data is stored therein. Furthermore, each noun word data is classified by the plural form of the word and stored in one of a plurality of blocks. The method of the classification is, for example, as follows. In the first block, singular forms of English noun words whose plural forms have a common suffix "s" are stored; in the second block, singular forms of English noun words whose plural forms have a common suffix "es" are stored and singular forms of other English noun words, and the plural forms of the words are stored in the third block and in the fourth block, respectively. In this classification, each block has an attribute data for the above-mentioned search means to discriminate words in the block from words in the other blocks. However, instead of the blocks, each noun word in the dictionary memory may have an attribute data to discriminate the word from words of the other parts of speech or from words to belong to the other blocks, so that the word can be found by the search means wherever the word exist in the dictionary memory. When the CPU 9 receives a singular form of an input English noun word, the word data stored in the first thru third blocks are successively searched to find the coincident word data to the input word. When receiving a plural form of an input English noun word, the CPU 9 searches successively through the plural form of the word data in the first block where said plural form has a common suffix "s", in the second block where the plural form has a common suffix "es" and in the fourth block to find the coincident word data to the input word.

A work memory 11 connected to the CPU 9 is embodied by a Random Access Memory (RAM), wherein a word data from the operation of the character keys 3 and the space key 4 thru the CPU is stored.

The CPU 9 judges whether or not an English word input by the character keys 3 and the space key 4 exists in the dictionary memory 10 and, if the word does not exist in the dictionary memory 10, flickers the input word on the CRT 7. When a noun word input by the character keys 3 and the space key 4 has one of the possessive suffixes, the CPU 9 judges whether or not the coincident word data to the input word without the suffix, i.e. the word without "'s" or "'", exists in the memory region designated as R of the dictionary memory 10, and if the coincident word data does not exist in the dictionary memory 10, flickers the input English word on the CRT 7.

Figure 4:
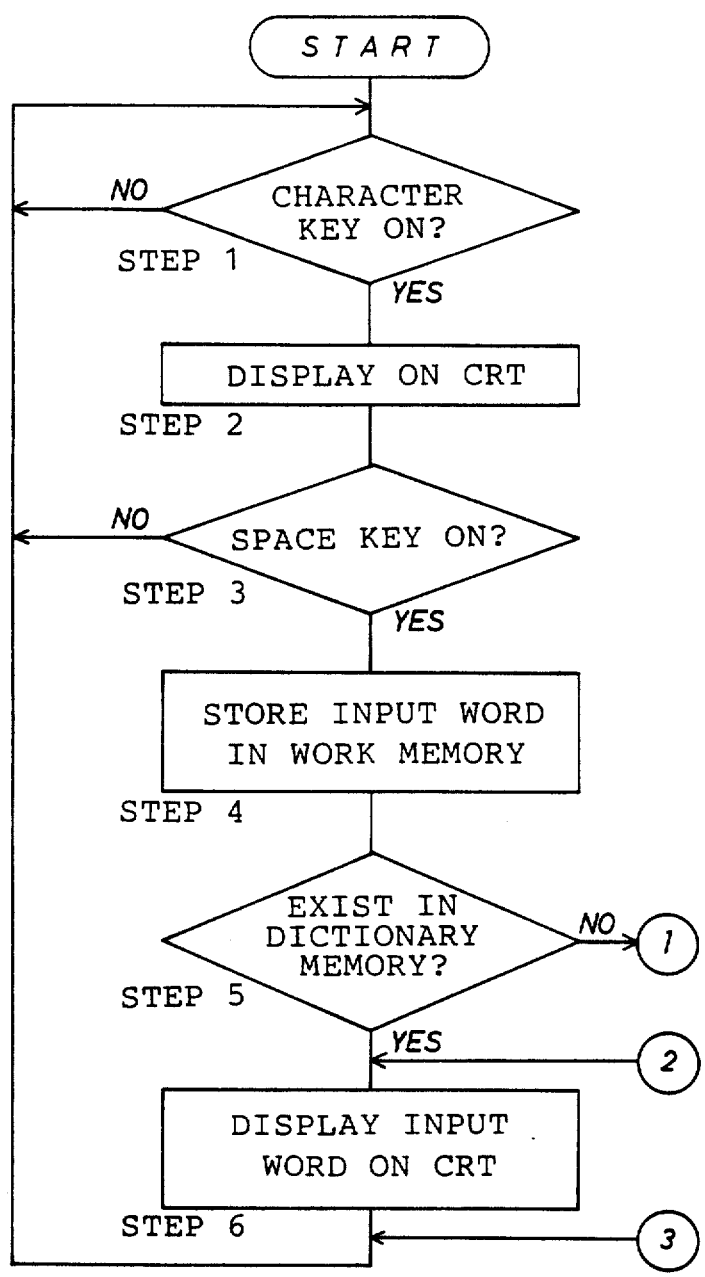
FIGS. 4, 5A and 5B are flow charts showing processing steps which are performed by this word processor.
Figure 5A:
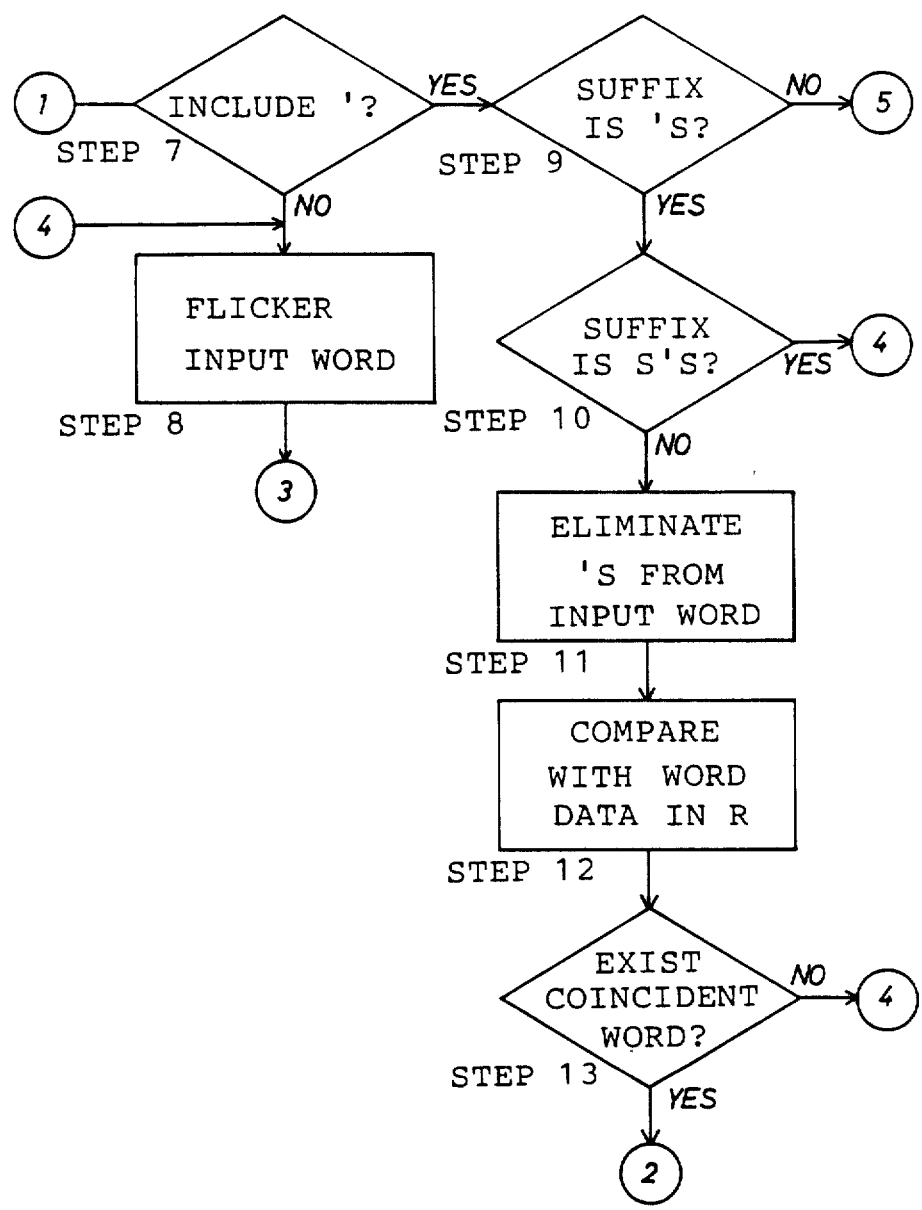
Figure 5B:
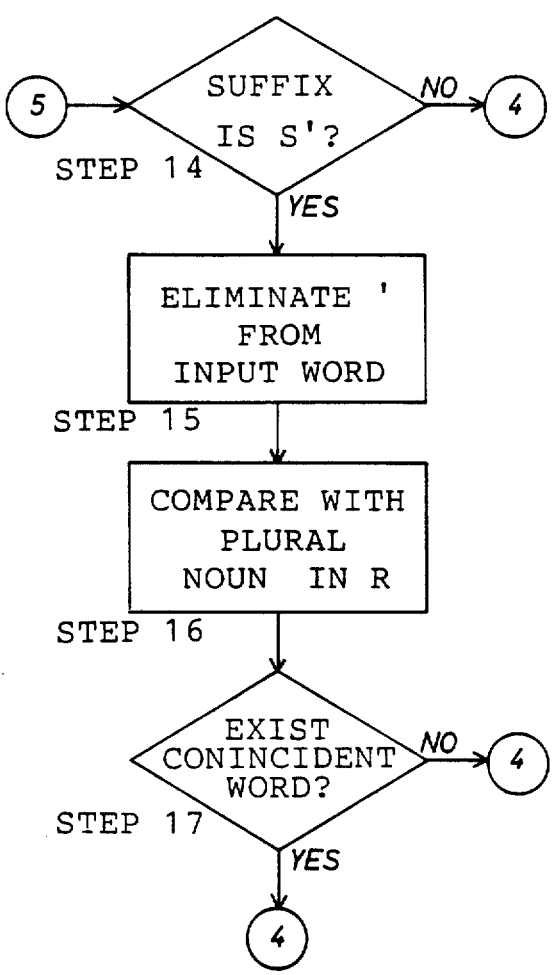

Referring now to FIGS. 4, 5A and 5B, the processing steps of the word processor 1 composed as described previously is illustrated. While the CPU 9 waits for the operation of various keys on the key board 2, if alphanumeric characters are input by the character keys 3 (STEP 1), the CPU 9 displays successively the characters on the CRT 7 (STEP 2). After a desired English word is input by the character keys 3, the space key 4 is to be pressed for leaving a fixed space between the word and the successive word (STEP 3) so that the CPU 9 recognizes the input characters as a word and stores the input word in the work memory 11 (STEP 4), and compares the input word with the word data stored in the dictionary memory 10 one by one to judge whether or not the coincident word data to the input English word exists in the dictionary memory 10 (STEP 5). If the CPU 9 judges that the input English word exists in the dictionary memory 10, the input word is displayed as it is on the CRT 7 (STEP 6) and the CPU 9 waits for another operation of the character keys 3 (STEP 1).

For example, when a word to be spelt as "consider" is mistakenly input as "consyder", the CPU 9 judges whether or not the word exists in the dictionary memory 10 (STEP 5), then judges whether or not the word has "'" (STEP 7). As the word "consyder" does not exist in the dictionary memory 10 and does not have "'", the CPU 9 flickers the word "consyder" on the CRT 7 (STEP 8) to inform an operator that the input word may be misspelt.

When a possessive singular noun word, e.g. "man's" is input by the character keys 3 and the space key 4, the CPU 9 reads successively the word data in the dictionary memory 10 to judge whether or not the coincident word to the input word exists in the word data (STEP 5). As possessive forms of words are not stored in the dictionary memory 10, then the CPU 9 judges whether or not the input word "man's" has "'" (STEP 7). If it is judged that the input word has "'", then the CPU 9 judges whether or not the suffix of the input word is "'s" (STEP 9). In this case, as the suffix of the word "man's" is "'s", the CPU 9 then judges whether or not the suffix of the word is "s's" (STEP 10). The word "man's" does not have the suffix "s's" so that the CPU 9 picks out the input word without the suffix, i.e. "man", from the work memory 11 (STEP 11) and compares one by one with the word data stored in the above-mentioned memory region designated as R of the dictionary memory 10 (STEP 12). Judging that the word "man" exists in the memory region R (STEP 13), the CPU 9 displays the input word "man's" as it is on the CRT 7 (STEP 6) and waits for another operation of the character keys 3 (STEP 1).

When a possessive plural noun, e.g. "girls'", is input by the character keys 3 and the space key 4, the CPU 9 judges that the coincident word data to the input word does not exist in the dictionary memory 10 (STEP 5), judges that the input word has "'" (STEP 7) and judges that the suffix of the input word is not "'s" (STEP 9). The CPU 9 then judges whether or not the input English word "girls'" has the suffix "s'", namely judges whether or not the input word is a possessive plural noun word (STEP 14). Now, as the word "girls'" is a possessive plural noun word, the CPU 9 eliminates "'" from the input word (STEP 15) and compares successively the input plural word "girls" with the plural noun word data stored in the first, second and fourth blocks in the memory region R of the dictionary memory 10 (STEP 16). If the coincident word to the input word exists in the plural noun word data (STEP 17), the CPU 9 displays the input word "girls'" as it is on the CRT 7 (STEP 6) and waits for another operation of the character keys 3 (STEP 1).

When an incorrectly spelled English word, e.g. a verb with a suffix "'s" such as "come's" is input, the CPU 9 judges that the input word does not exist in the dictionary memory 10 (STEP 5). After judging that the input word has "'" (STEP 7), the CPU 9 judges that the suffix of the word is "'s" (STEP 9). Then judging that the suffix of the word is not "s's" (STEP 10), the CPU 9 eliminates the suffix "'s" from the input English word "come's" (STEP 11) to compare successively the de-suffixed word "come" with the word data stored in the memory region R of the dictionary memory 10 (STEP 12). Judging that the de-suffixed word "come" does not exist in the memory region R storing only noun words (STEP 13), the CPU 9 flickers the input word "come's" on the CRT 7 (STEP 8) to inform an operator that the input word does not exist in the dictionary memory 10, and waits for another operation of the character keys 3 (STEP 1).

Spellings of input words are successively checked as described above. When the CPU 9 judges that an input word does not exist in the dictionary memory 10 and flickers the input word on the CRT 7, if the word needs correcting, the word is selected by cursor keys and corrected by a correction key 5 and the character keys 3, then the corrected English word is stored in the work memory 11. However, if there is no necessity of correcting the flickering word, the word is selected by the cursor keys and is stored in the work memory 11 as it is by a selective key 6.

As described above, in this word processor 1, an input English word is compared with the word data in the dictionary memory 10 to check the spelling and, if the word does not exist in the dictionary memory 10, the input word is flickered on the CRT 7. When a possessive singular noun word is input, the CPU 9 judges whether or not the de-suffixed word corresponding to the input possessive noun word exists in the first through third blocks in the memory region designated as R storing only English noun words in the dictionary memory 10, and when a possessive plural noun word is input, the desuffixed input word is successively compared with the plural noun word data in the first, second and fourth blocks in the memory region R' if the corresponding plural word data does not exist in the memory region R, the input word is flickered on the CRT 7. Consequently, when a possessive noun word is input, the spelling of the input word is accurately checked in the range of the memory region R in the dictionary memory 10. If a word other a noun mistakenly has a suffix such as "'s" or "'", the input word is flickered on the CRT 7 as the de-suffixed input word does not exist in the memory region R so as to make an operator check the spelling of the input word and correct the misspelling of the word easily.

As described in detail above, this invention has advantages that the spelling of an input possessive noun word can be accurately checked and, if an input word but noun mistakenly has a suffix such as "'s", an operator is informed that the input English word does not exist in the dictionary memory, so that the operator can correct the misspelling of the word easily resulting in the efficiency of the operation being increased. Moreover, as it is not necessary that the capacity of the dictionary memory increases largely to get the abovementioned advantages, the present invention offers a practical electronic dictionary system.

What is claimed is:

1. A system for checking a spelling of an input English noun word comprising:

an input means for inputting an English word;

a dictionary memory for storing a plurality of English words which are classified into a first group and a second group, said first group including noun words and said second group including non-noun words, the noun words being stored in a specified memory region storing only noun words in the dictionary memory, said memory region being divided into four blocks including a first block of words whose plural forms can have a common suffix "s"; a second block of words whose plural forms can have a common suffix "es"; a third block of other words of singular form; and a fourth block of words each of which is a plural form of each word in the third group;

a search means for searching whether or not an input word exists in the dictionary memory;

a suffix judgment means for judging whether or not an input word which does not exist in the dictionary memory has a possessive suffix and, if the input word has a possessive suffix, for searching through the first group in the dictionary memory to find, in cooperation with the search means, word data coincident with the input word without the possessive suffix; and an output means for displaying the input word and indicating whether or not the input word is spelled correctly.

2. The system of claim 1 wherein each block in the specified memory region storing only noun words in the dictionary memory has attribute data for the search means to discriminate words in the block from words in the other blocks.

3. The system of claim 1 wherein each noun word in the dictionary memory has attribute data to discriminate the word from words of the other parts of speech or from words included in the other blocks so that the word can be found by the search means wherever the word exists in the dictionary memory.

* * * * *